Patented Jan. 30, 1945

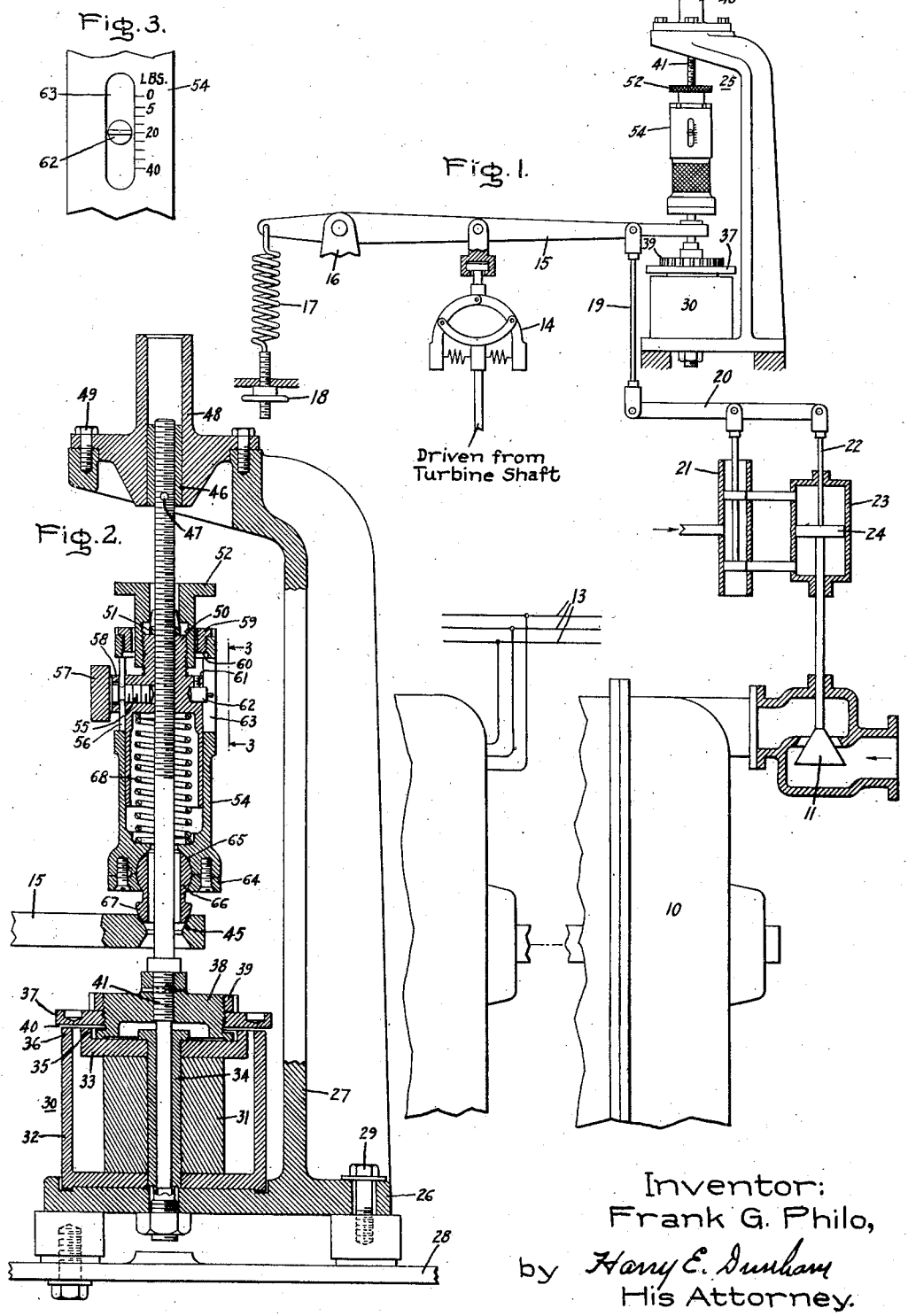

2,368,567

UNITED STATES PATENT OFFICE 2,368,567

GOVERNING MECHANISM

Frank G. Philo, Long Beach, Calif., assignor to General Electric Company, a corporation of New York Application June 11, 1942, Serial No. 446,566

3 Claims. (Cl. 264—3)

The present invention relates to governing mechanisms for controlling the flow of operating medium to a prime mover. More specifically the invention relates to mechanisms which include means for maintaining the load of a prime mover constant as long as its speed or the frequency of a generator driven by it remain within certain limits. With such arrangement a 10,000 kw. turbo generator, for example, may be controlled to furnish a constant output of 5,000 kw. as long as the turbine speed remains within one per cent of its normal operating speed. If then a greater speed change occurs the load limiting device is automatically rendered ineffective or inoperative and the turbine is perimtted to take on or throw off load. In arrangements of this kind it is desirable to vary the load setting of the prime mover.

The object of my invention is to provide an improved construction and arrangemnt of governing mechanisms and load-limiting and load-setting devices whereby the load of a prime mover may be readily set and maintained constant within a predetermined range of speed change or like operating condition of the prime mover or within a predetermined range of frequency change of a generator driven thereby.

For a consideration of what I believe to be novel and my invention, attention is directed to the following description and the claims appended thereto in connection with the accompanying drawing.

In the drawing Fig. 1 illustrates a prime mover governing mechanism embodying my invention; Fig. 2 is an enlarged view of a load-setting and load limiting device of the arrangement in Fig. 1; and Fig. 3 is a side view along line 3—3 of Fig. 2.

The arrangement comprises a prime mover, in the present instance an elastic fluid turbine 10, with an inlet valve 11 for controlling the flow of elastic fluid thereto. The turbine is arranged to drive an electric generator 12 connected to a power line 13. The valve 11 may be controlled in response to speed changes of the turbine 10 by means of a governing mechanism which includes a speed governor 14 driven from the turbine shaft and having flyweights pivotally connected to an intermediate point of a governor beam 15 supported on a fulcrum 16 and biased by a synchronizing spring 17 adjustable by means of a handwheel 18. The right-hand portion of the beam 15 is connected by a link 19 to the left-hand end of a floating follow-up lever 20. An intermediate point of the lever 20 is connected to a pilot valve 21 and the right-hand end of the lever 20 is connected to a stem 22 of a servo motor 23 having a piston 24 secured to the stem 22. An extension of the stem 22 is fastened to the turbine inlet valve 11. The mechanism so far described is well known in the art and typical for controlling elastic fluid turbine admission valves in response to changes of an operating condition, in the present instance the speed of the turbine.

During operation an increase in speed due to decreased load demand from the turbine causes outward movement of the weights of the governor whereby the beam 15 is turned clockwise about the fulcrum 16, thus causing downward movement of the heads of the pilot valve 21 to admit operating fluid under pressure to the lower face of the piston 24 of the hydraulic motor 23, resulting in upward movement of the piston 24 and closing movement of the valve 11 to reduce the admission of elastic fluid to the turbine. Upward movement of the piston 24 through the follow-up lever 20 causes upward movement of the valve heads of the pilot valve 21 whereby the latter are restored to their original line-in-line position. Similarly, a decrease in speed due to increased load demand causes movement of the various elements in a direction opposite to the one just described to effect opening of the valve 11.

The load on the turbine may be set in known manner for a given speed by adjusting the tension of the synchronizing spring 17. With a governing mechanism of this kind any speed change will result in positioning of the turbine inlet valve and a changing load output of the turbine.

According to the invention a device 25 is cooperatively associated with the right-hand end portion of the governor beam 15 for fixing any load of the turbine and maintaining it constant within a certain speed range of the turbine, or, from another viewpoint, as long as the frequency change in the line 13 remains within certain limits above and below normal frequency. The device as best shown in Fig. 2 comprises a base 26 with a bracket 27 secured to a fixed support 28 by a plurality of bolts 29. An ironclad type of permanent magnet 30 is supported on and secured to the base 26. The magnet has a cylinder 31 of permanent magnetic material, such as an iron aluminum nickel alloy known under the name Alnico, centrally disposed within a jacket or steel frame 32. A pole plate 33 is clamped to the upper end of the cylinder 31 and to the base 26 by a hollow bolt 34 of non-magnetic material. The pole plate 33 forms an annular pole 35 of a polarity opposite to an annular pole 36 formed by the upper end of the jacket 32. The poles 35 and 36 form a comparatively wide air gap between them and they are cooperatively associated with a magnetic ring or armature 37 screwed onto a plug 38 of non-magnetic material and locked thereto by means of a locking nut 39. The magnetic ring 37 forms an air gap 40 with the poles 35, 36. The gap may be adjusted upon loosening of the locking nut 39 and adjustment of the ring 37 on the plug 38. The plug 38 is securely fastened to a rod or spindle 41 and the lower end of the plug 38 is seated in a recess in the upper face of the pole plate 33. The magnetic field of the magnet passes through the magnetic cylinder 31, the jacket 32, the air gap 40, the armature 37 and the pole plate 33. The magnet exerts a fixed force on the armature 37, thus holding the rod 41 with a predetermined force which may be varied by adjustment of the armature 37.

The rod 41 has sliding fit in the bore of the bolt 34 and projects through a conical opening 45 in the right-hand end portion of the governor beam 15. The upper portion of the rod 41 is threaded. A bearing sleeve 46 is secured to the threaded end portion of the rod by a pin 47 and has sliding fit in a bearing 48 secured to the upper end of the bracket 27 by bolts 49. An inner sleeve 50 has an upper threaded hub portion screwed onto the rod 41. The sleeve 50 may be fixed in its position by means of a lock washer 51 and a locking nut 52. An outer sleeve 54 telescopes the inner sleeve 50 and may be fixed in its position by means of a set screw 55 secured to the inner sleeve 50 and projecting through a vertically extending slot or opening 56 in the outer sleeve 54. The screw 55 has a knurled head 57 for forcing a washer 58 towards the outer sleeve 54.

An annular plug 59 is screwed into the upper end of the outer sleeve to form a shoulder or stop 60 in cooperative relation with a shoulder 61 formed on the inner sleeve to limit relative movement between the inner and outer sleeves. Thus the two sleeves are movable relative to each other and to the rod. They may be moved apart until the shoulder 61 engages the stop 60 formed by the plug 59. The relative position between the inner and outer sleeves is indicated by an indicator 62 which in the present instance is in the form of a set screw or projection secured to the inner sleeve and projecting into a slot 63 of the outer sleeve 54. The outer sleeve adjacent the slot, as shown in Fig. 3, is provided with a scale to indicate exactly the relative position between the inner and outer sleeves.

The lower end of the outer sleeve is enlarged and has a separate end plate 64. This lower end with the end plate is shaped to form a spherical bearing or socket 65 for a ball member 66 securely held in the socket and having a cylindrical bore concentric with the rod 41. An extension 67 of the ball member 66 engages the conical opening 45 of the governor beam 15. A compression spring 68 concentrically surrounds the rod 41 within the sleeves 50, 54, the upper end of the spring bearing against a shoulder or seat formed by the inner sleeve 50 and the lower end bearing against a shoulder or seat formed by the outer sleeve 54. The purpose of this spring is to measure the force with which the extension 67 of the ball member 66 is forced against the governor beam 15 upon loosening the set screw 55. The magnitude of the force is indicated in pounds by the indicator or pointer 62 on the aforementioned scale (Fig. 3). In the present example the pointer 62 registers with a mark "20," meaning that the member 67 is positioned to exert a force of 20 pounds onto the right-hand end of the governor beam 15. With such original setting the governor 14 will cause downward movement upon increasing speed only upon an increase of the downward governor force measured at the right-hand end of the governor beam 15 of more than 20 pounds. Likewise if the magnet is set to release the armature 37 when the total upward force on rod 41 exceeds 40 pounds, then upon decreasing speed the governor lever 15 will be turned upward (counterclockwise about the fulcrum 16) only when the governor exerts an upward force such that the total upward force on member 67 exceeds 40 pounds.

Assuming now that the device 25 is to be adjusted for .6 cycle change in frequency to maintain a constant turbine output of 5,000 kw., as long as the frequency in the line 13 remains within .6 cycle of the normal frequency of 60 cycles, in other words, to maintain constant load output of 5,000 kw. as long as the generator frequency remains within the limits of 59.4 and 60.6 cycles. The procedure for placing the load-setting and load-limiting device 25 in service is then as follows: The turbine governor synchronizing means, in the present example the spring 17, is set by adjusting the hand wheel 18 to hold a turbine load of 5,000 kw. at 60 cycles. During this setting the extension 67 of the ball member 66 is removed from the governor beam 15, that is, the setting is made while the right-hand end of the beam 15 is disengaged from the extension 67. Thereupon the operator turns the inner sleeve 50 with the outer sleeve 54 as a unit downward on the rod 41 until the member 67 engages the lever 15. Upon further downward turning movement of the two sleeves the indicator 62 moves away from point "0." This is continued until the indicator 62 registers with the mark "10 lbs." of the scale. In this position the device exerts a force of 10 pounds on the right-hand end of the beam 15, thus forcing the beam 15 downward, that is, clockwise about the fulcrum 16. In order to bring the beam back to its former position in which the turbine carried 5000 kw. the synchronizing spring 17 now is adjusted to turn the beam counterclockwise until the indicator 62 registers with the mark "20 lbs." of the scale. The locking nut 52 and the locking screw 55 now may be tightened. After such adjustment, the end of the lever 15 exerts a total upward force of 20 pounds on the member 67, by reason of the biasing force exerted by the synchronizing spring 17. The previously mentioned tightening of lock screw 55 results in making a rigid connection between the ball member 66 and the rod 41. The turbine is now set for constant valve opening at which it will furnish a load of 5,000 kw., which load will be maintained constant until the turbine speed rises more than .6 cycle. When this occurs the governor beam 15 moves away from the extension 67 of the ball member 66 and causes movement of the pilot valve 21 and the hydraulic motor 23 to close the admission valve 11. It should be noted that as the force exerted downwardly by the flyball governor 14 increases, the force exerted upwardly by lever 15 on member 67 decreases. When the turbine speed rise corresponds to an increase of .6 cycle in the electric current in line 13, the force exerted upwardly by lever 15 on member 67 is zero, and the force exerted by the flyball governor just balances the force of the synchronizing spring 17 (assuming that the link 19 exerts no force on lever 15). Up to this point the lever 15 has not moved; the only change has been that the reaction force exerted downwardly by member 67 on the end of lever 15 has been replaced by a force exerted by flyball governor 14 downwardly. If then the turbine speed rises still further, flyball governor 14 will exert an additional unbalanced force downward on lever 15, which force will move lever 15 clockwise to decrease the opening of valve 11 and reduce the speed of turbine 10.

In case the turbine speed drops, the governor 14 exerts an upward force on lever 15. When the drop in speed corresponds to .6 cycle, the governor exerts a force on lever 15 producing an upward force of 20 pounds on member 67. This force is added to the "preloading" force of 20 pounds imposed on member 67 by the bias of spring 17 to give a total upward force on member 67 of 40 pounds, which total is communicated to the magnetic holding device 30 through the fixed connection between sleeves 50 and 54 and rod 41. If then the speed drops still further and the governor 14 exerts an increased upward force on lever 15, the magnetic bond between armature 37 and magnet 31 is broken and lever 15 is free to move upwardly to open admission valve 11 and raise the speed of turbine 10.

The procedure for changing the load-setting on the machine is as follows: Assuming the load-setting is to be changed from 5,000 to 10,000 kw., the turbine operator will first see that the frequency in the line 13 to which ordinarily other turbogenerators are connected in parallel is 60 cycles. He then loosens the lock screw 55 and the locking nut 52 and revolves the inner sleeve 5 with the outer sleeve 54 in a direction to raise them, moving them upward on the rod 41. This causes opening of the turbine valve 11 permitting the turbine to pick up load. The synchronizing wheel 18 is then moved in a direction to increase the tension of the spring 17 to raise the turbine load to 10,000 kw. As this load is reached the right-hand end of the beam 15 should move freely relative to the extension 67 of the ball member 66. Thereupon with both the locking screw 55 and the locking nut 52 loose the inner and outer sleeves 54 and 50 as a unit are turned downward on the rod 41 until the pointer 62 registers with the mark "10 lbs." of the scale, thus exerting a downward pressure of 10 pounds on the right-hand end of the beam 15. The force of 10 pounds on the right-hand end of the beam 15 causes downward movement of the right-hand end of the beam 15, causing a change of the governor position. In order to restore the beam and the governor to their former positions in which the turbine carried 10,000 kw. the synchronizing spring 17 now is tightened to force the right-hand end of the beam upward until the pointer 62 registers with the mark "20 lbs." of the scale, thus imposing an additional force of 10 pounds on the right-hand end of the beam 15 and bringing the latter back to the desired position in which the turbine carries 10,000 kw. The locking screw 55 then is tightened. A constant load output of 10,000 kw. is maintained until the frequency changes more than .6 cycle from normal frequency.

Thus, with my invention I have accomplished an improved construction and arrangement of governing mechanisms whereby the load of a prime mover may be readily set at any desired value and maintained constant within a certain range of an operating condition within which the governor is rendered ineffective.

The magnetic device 30 broadly constitutes retaining means for holding the end of lever 15 from upward movement until the force exerted upwardly by the end of lever 15 against member 67 exceeds a force which is preselected by proper adjustment of the air gap 40. The inner and outer sleeves are elements adjustable relative to each other and to the rod 41 and finally, the spring between the two sleeves or elements, together with the indicator 62, constitute means for measuring the force exerted by the end of lever 15 upwardly against member 67 while setting the adjustments.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a governing mechanism, the combination of a pivoted lever, adjustable resilient means biasing the lever to rotate counterclockwise, a condition-responsive device connected to the lever and arranged to exert a variable control force on the lever in either direction, stop means engaging the lever and arranged to cooperate with the resilient means to prevent rotation of the lever in either direction until the force applied by the condition-responsive device exceeds predetermined values, the stop means including a stationary magnet, an armature cooperating with the magnet and carrying a projecting rod, and a stop member adjustably secured to the rod and engaging the lever to exert only a clockwise force on the lever.

2. In a governor, the combination of a pivoted lever, adjustable spring means arranged to bias the lever for rotation counterclockwise, a condition-responsive device arranged to exert a variable control force on the lever in either direction, stop means engaging the lever and cooperating with the spring means to prevent rotation of the lever in either direction until the force applied to the lever by the condition-responsive device exceeds predetermined values, the stop means including a stationary magnet, an armature cooperating with the magnet and having a projecting rod, a first element adjustably secured to the rod, a second element engaging the lever and arranged to exert a force on the lever clockwise only, means for adjustably securing the second element to the first element, and means associated with the first and second elements for measuring the force exerted by the second element on the lever when the securing means is released for the purpose of adjusting the first and second elements.

3. In a governor, the combination of a pivoted lever, a first adjustable resilient means arranged to bias the lever for rotation counterclockwise, a condition-responsive device arranged to exert a variable control force on the lever in either direction, stop means engaging the lever and cooperating with the first resilient means to prevent rotation of the lever in either direction until the force applied to the lever by the condition-responsive device exceeds predetermined values, the stop means including a stationary magnet, an armature cooperating with the magnet and having a projecting rod, a first sleeve adjustably fixed to the rod, a second sleeve arranged in telescopic relation with the first sleeve and having a portion engaging the lever and arranged to exert a force on the lever clockwise only, means adjustably securing the first and second sleeves together, an indicator on one sleeve, a measuring scale on the other sleeve cooperating with the indicator for showing the position of one sleeve relative to the other, and a second resilient means arranged to bias the sleeves apart, said second resilient means, sleeves, indicator, and scale constituting means for measuring the clockwise force exerted by the stop means on the lever when the securing means is released during adjustment of the sleeves relative to each other.

FRANK G. PHILO.